United States Patent
Lv et al.

(10) Patent No.: US 12,481,324 B2
(45) Date of Patent: Nov. 25, 2025

(54) INWARD FOLDABLE SCREEN ELECTRONIC DEVICE

(71) Applicant: Huawei Technologies Co., Ltd., Shenzhen (CN)

(72) Inventors: Chengling Lv, Dongguan (CN); Wenhong Chen, Shenzhen (CN); Cong Huang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 524 days.

(21) Appl. No.: 18/003,641

(22) PCT Filed: Jun. 26, 2021

(86) PCT No.: PCT/CN2021/102577
§ 371 (c)(1),
(2) Date: Dec. 28, 2022

(87) PCT Pub. No.: WO2022/001907
PCT Pub. Date: Jan. 6, 2022

(65) Prior Publication Data
US 2023/0240119 A1    Jul. 27, 2023

(30) Foreign Application Priority Data
Jun. 29, 2020    (CN) .......................... 202010605305.0

(51) Int. Cl.
*H10K 59/80*    (2023.01)
*G06F 1/16*    (2006.01)
*H05K 5/02*    (2006.01)
*H10K 102/00*    (2023.01)
*H10K 77/10*    (2023.01)

(52) U.S. Cl.
CPC .......... *G06F 1/1652* (2013.01); *H05K 5/0226* (2013.01); *H10K 59/873* (2023.02); *H10K 77/111* (2023.02); *H10K 2102/311* (2023.02)

(58) Field of Classification Search
None
See application file for complete search history.

(56) References Cited

U.S. PATENT DOCUMENTS

| | | |
|---|---|---|
| 2017/0170042 A1 | 6/2017 | Kim et al. |
| 2018/0269426 A1 | 9/2018 | Okamoto et al. |
| 2021/0408402 A1 | 12/2021 | Zhu et al. |
| 2022/0005385 A1* | 1/2022 | Feng .................. G09F 9/301 |
| 2022/0155827 A1* | 5/2022 | Xu ..................... G06F 1/1652 |

(Continued)

FOREIGN PATENT DOCUMENTS

| | | |
|---|---|---|
| CN | 106887529 A | 6/2017 |
| CN | 107068895 A | 8/2017 |
| CN | 108470853 A | 8/2018 |

(Continued)

*Primary Examiner* — Kyoung Lee
(74) *Attorney, Agent, or Firm* — Conley Rose, P.C.

(57) ABSTRACT

An inward foldable screen electronic device having a flexible display that includes an encapsulation layer, a light-emitting layer, a substrate, a base film, and a support sheet that are sequentially stacked. An interface exists between the encapsulation layer and the light-emitting layer, and the support sheet has a complete surface. The encapsulation layer and the light-emitting layer of the flexible display are not prone to lift off from each other.

20 Claims, 6 Drawing Sheets

(56) References Cited

U.S. PATENT DOCUMENTS

2022/0159856 A1    5/2022  Xie et al.

FOREIGN PATENT DOCUMENTS

| | | |
|---|---|---|
| CN | 208422962 U | 1/2019 |
| CN | 208922655 U | 5/2019 |
| CN | 109860251 A | 6/2019 |
| CN | 109949707 A | 6/2019 |
| CN | 110164309 A | 8/2019 |
| CN | 110581229 A | 12/2019 |
| CN | 110992838 A | 4/2020 |
| CN | 111179760 A | 5/2020 |
| WO | 2019237485 A1 | 12/2019 |

* cited by examiner

INWARD FOLDABLE SCREEN ELECTRONIC DEVICE

CROSS-REFERENCE TO RELATED APPLICATIONS

This is a National Stage of International Patent Application No. PCT/CN2021/102577 filed on Jun. 26, 2021, which claims priority to Chinese Patent Application No. 202010605305.0 filed on Jun. 29, 2020. Both of the aforementioned applications are hereby incorporated by reference in their entireties.

TECHNICAL FIELD

This application relates to the field of terminal product technologies, and in particular, to an inward foldable screen electronic device.

BACKGROUND

A flexible display includes an encapsulation layer and a light-emitting layer. The light-emitting layer can emit light when being powered on, so that the flexible display implements display. The encapsulation layer is configured to encapsulate and protect the light-emitting layer. In the flexible display, a bonding force between the encapsulation layer and the light-emitting layer is relatively weak.

The flexible display may be applied to an inward foldable screen Mobile phone. After the inward foldable screen mobile phone is folded for a plurality of times, the encapsulation layer and the light-emitting layer in a partial area of the flexible display are prone to lift off from each other, to cause a failure of the flexible display.

SUMMARY

This application provides an inward foldable screen electronic device, to reduce a risk of an encapsulation layer and a light-emitting layer in a flexible display lifting off from each other.

According to a first aspect, this application provides an inward foldable screen electronic device, including a first housing, a hinge, a second housing, and a flexible display. The hinge connects the first housing and the second housing, and the first housing rotates relative to the second housing by using the hinge. The flexible display is mounted on the first housing and the second housing. When the first housing and the second housing are closed, the flexible display is bent and accommodated between the first housing and the second housing. The flexible display has a bending region and a flat region that are connected to each other. The flexible display includes an encapsulation layer, a light-emitting layer, a substrate, a base film, and a support sheet that are sequentially stacked. The encapsulation layer is located on a side that is of the flexible display and that is away from the hinge. An interface exists between the encapsulation layer and the light-emitting layer. The support sheet has a complete surface. A thickness of the base film is 15 μm to 25 μm, and/or a modulus of the base film is 3 GPa to 5 GPa, and/or a thickness of the support sheet is 0.02 mm to 0.03 mm, so that when the flexible display is in a bent state, a neutral layer of a region that is of the bending region and that is adjacent to the flat region is located on a side that is of the interface and that is away from the encapsulation layer.

In this application, the hinge may be a mechanism including several components, and the hinge can generate a mechanism movement. The mechanism movement of the hinge enables the first housing and the second housing to rotate relative to each other, so that the first housing can be unfolded or closed relative to the second housing, and the inward foldable screen electronic device can be unfolded or folded. When the inward foldable screen electronic device is in a folded state, the first housing and the second housing are closed, and the flexible display is bent and accommodated in the housing. Both the first housing and the second housing may be used as external parts of the inward foldable screen electronic device, that is, exposed parts that can be directly observed by a user. Alternatively, the inward foldable screen electronic device may include a housing used as an external part, and both the first housing and the second housing may be mounted in the housing as non-external parts (for example, a middle frame). The first housing and the second housing are configured to bear the flexible display, and drive the flexible display to be bent and unfolded.

In this application, the flexible display may be divided into a first flat region, a bending region, and a second flat region based on deformation of parts of the flexible display, and the bending region is connected between the first flat region and the second flat region. The first flat region and the second flat region are connected to two ends of the bending region, and the first flat region and the second flat region may be collectively referred to as a flat region. The first flat region may be fastened to the first housing, and the second flat region may be fastened to the second housing. The bending region is not connected to the first housing and the second housing, and the bending region may be spaced from the hinge in both an unfolded state and a bent state, to avoid mutual interference. During bending and unfolding of the flexible display, the first flat region and the second flat region basically do not deform, and can remain in an original flat (or plane) state, while the bending region may be bent and unfolded.

In this application, from a perspective of a laminated structure of the flexible display, the flexible display includes an encapsulation layer, a light-emitting layer, a substrate, a base film, and a support sheet. The encapsulation layer, the light-emitting layer, the substrate, the base film, and the support sheet are sequentially stacked, the encapsulation layer is far away from the hinge, and the support sheet is close to the hinge. The substrate may be made of polyimide (polyimide, PI), and a TFT array may or may not be formed on the substrate. A modulus of the substrate is approximately 5 GPa to 9 GPa. The light-emitting layer is formed on the substrate. The light-emitting layer can emit light, so that a flexible display panel implements display. The light-emitting layer may be an organic light-emitting diode layer. A modulus of the light-emitting layer is approximately 4 GPa to 5 GPa. The encapsulation layer covers the light-emitting layer, and encapsulates the light-emitting layer, to block water and oxygen and ensure performance and a service life of the light-emitting layer. The encapsulation layer may be manufactured by using a thin film encapsulation process. A thickness of the encapsulation layer may be 11.6 μm. A modulus of the encapsulation layer is approximately 25 GPa (for example, 25.17 GPa). The base film can be attached to the substrate, and the base film plays a protective role. The base film can be made of polyimide. A thickness of the base film may range from 15 μm to 25 μm (a thickness of a conventional base film may reach 50 μm or 75 μm). A modulus of the base film may be 3 GPa to 5 GPa (a modulus of a conventional base film may reach 5 GPa to 8 GPa). The support sheet can be attached to the base film. The support sheet may be used as a support and load-bearing structure in the flexible display. When the support sheet is not bent, the support sheet may be in a flat sheet shape. This can ensure flatness of the flexible display. The surface of the support sheet basically has no structure features such as holes and grooves obtained by removing materials. The thickness of the support sheet may range from 0.02 min to 0.03 mm (a thickness of a conventional support sheet may reach 0.03 min to 0.05 mm). Such a support sheet has high structural strength and good bending performance. A modulus of the support sheet may be 180 GPa to 210 GPa.

In this application, any one, two, or three of three designs of thinning the base film, reducing the modulus of the base film, and thinning the support sheet can be used to adjust a neutral layer of a region that is of the bending region and that is adjacent to the flat region, until the neutral layer is located on a side that is of an interface between the encapsulation layer and the light-emitting layer and that is away from the encapsulation layer. To be specific, the neutral layer deviates from the interface toward a direction close to the support sheet, and the neutral layer is located between the interface and a surface that is of the support layer and that is away from the base film. According to a related principle of material mechanics, after the neutral layer of the region that is of the bending region and that is adjacent to the flat region is located at the location, the interface is subject to a reverse normal compressive stress, and the reverse normal compressive stress is used to separately press parts on both sides of the interface to the interface, so that the parts on both sides of the interface are not prone to lift off from each other. Therefore, a problem that the light-emitting layer and the encapsulation layer lift off from each other is alleviated.

In an implementation, the flexible display further includes an adhesive layer. The base film is bonded to the substrate by using the adhesive layer, and a modulus of the adhesive layer is 30 KPa to 80 KPa (a modulus of a conventional adhesive layer may reach 80 KPa to 200 KPa). The modulus of the adhesive layer is reduced, so that stiffness of a laminate on a side that is of the substrate and that is away from the light-emitting layer can be reduced. According to the related principle of material mechanics, the neutral layer can also be located on the side that is of the interface and that is away from the encapsulation layer, to alleviate and avoid a problem of lift-off, and improve reliability of the flexible display.

In an implementation, the adhesive layer is a pressure sensitive adhesive layer or an optically clear adhesive layer. Such an adhesive layer has stable performance, which helps ensure reliability of the flexible display.

In an implementation, the base film is a polyimide film. Such a base film has stable performance, good protection performance, and good bending performance, which helps ensure reliability of the flexible display.

In an implementation, a modulus of the support sheet is 180 GPa to 210 GPa. Such a support sheet is impact-resistant and bending-resistant, which helps ensure reliability of the flexible display.

In an implementation, the support sheet is a metal sheet, for example, may be a stainless steel (such as SUS stainless steel) sheet or a copper sheet. The support sheet made of metal has relatively high structural strength, good impact resistance, and good protection performance, which helps improve reliability of the flexible display.

In an implementation, when the flexible display is in the bent state, the bending region is in a water drop shape, that is, the bending region is in a shape like a water drop. Such a flexible display is a mature structure form of an inward foldable screen, and has good mass production. More importantly, a conventional inward foldable screen with a water drop shape is more prone to lift off in a region that is of the bending region and that is adjacent to the flat region. In this implementation, according to the design of adjustment of the neutral layer, a problem of lift-off can be better overcome, and reliability of the flexible display can be improved.

In an implementation, the flexible display further includes a flexible cover and a polarizer that are stacked. The polarizer is located between the flexible cover and the encapsulation layer. The flexible cover may be used as a protective layer of the flexible display. A thickness of the polarizer may range from 40 μm to 73 μm. A modulus of the polarizer may be less than or equal to 4 GPa. Such a flexible display has a mature design and good mass production. More importantly, according to the design of adjustment of the neutral layer, a lift-off problem of the flexible display can be better overcome, and reliability of the flexible display can be improved.

In an implementation, the flexible cover includes a cover protective layer and a cover substrate layer that are stacked. The cover substrate layer is located between the cover protective layer and the polarizer. A thickness of the cover protective layer is 40 μm to 75 μm, and a modulus of the cover protective layer is greater than or equal to 4 GPa. A thickness of the cover substrate layer is 40 μm to 80 μm and a modulus of the cover substrate layer is greater than or equal to 7 GPa.

In this implementation, the cover protective layer may be used as an outer protection structure of the flexible cover. The thickness of the cover protective layer may range from 40 μm to 75 μm. The modulus of the cover protective layer may be greater than or equal to 4 GPa. Such a cover protective layer has good impact resistance. The cover protective layer may have proper hardness, to provide a proper touch feeling. The cover substrate layer may be used as a main support structure of the flexible cover. The thickness of the cover substrate layer may range from 40 μm to 80 μm. The modulus of the cover substrate layer may be greater than or equal to 7 GPa. Such a cover substrate layer may have good impact resistance. The cover substrate layer may be made of polyimide, or may be made of another suitable material like ultra-thin glass. Such a flexible display has a mature design and good mass production. More importantly, according to the design of adjustment of the neutral layer, a lift-off problem of the flexible display can be better overcome, and reliability of the flexible display can be improved.

In an implementation, a thickness of the base film is 15 μm to 25 μm, a thickness of the support sheet is 0.02 mm to 0.03 mm, a thickness of the polarizer is 40 μm to 73 μm, and a modulus of the polarizer is less than or equal to 4 GPa. Such a flexible display has a mature design and good mass production. More importantly, both the base film and the support sheet are thinned, so that the neutral layer can be located on the side that is of the interface between the encapsulation layer and the light-emitting layer and that is away from the encapsulation layer. Therefore, a lift-off problem of the flexible display is better overcome, and reliability of the flexible display is improved.

DESCRIPTION OF EMBODIMENTS

The following embodiments of this application provide an inward foldable screen electronic device. The inward foldable screen electronic device includes but is not limited to an inward foldable screen mobile phone, an inward foldable screen tablet computer, an inward foldable screen wearable device, and the like. The inward foldable screen electronic device may include a housing and a flexible display, and the flexible display is borne on the housing. When the inward foldable screen electronic device is in a folded state, the housing is closed, and the flexible display is bent and accommodated in the housing. Details are described below.

Figure 1:
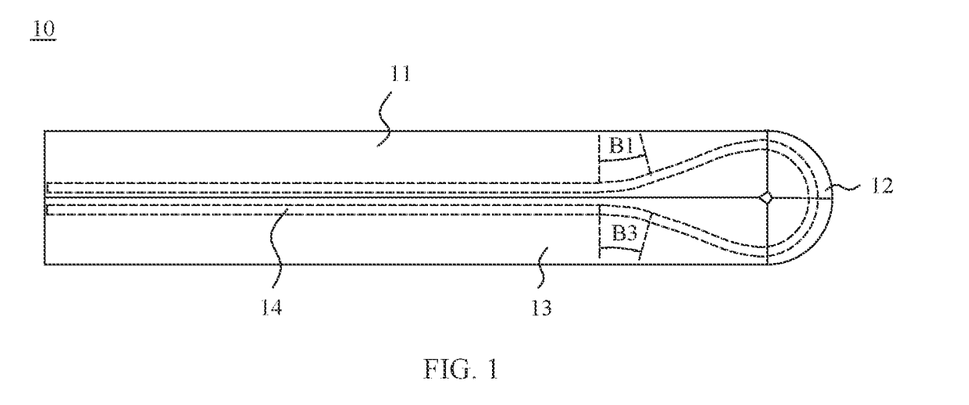
FIG. 1 is a schematic side view of a structure of an inward foldable screen electronic device according to Embodiment 1.
Figure 2:
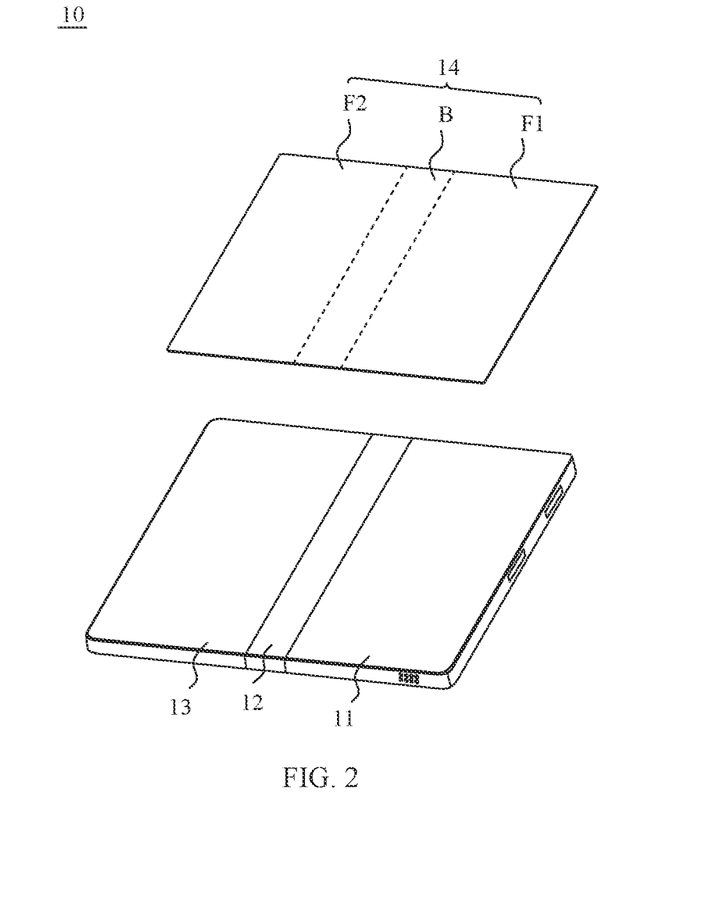
FIG. 2 is a schematic exploded view of a structure of the inward foldable screen electronic device in FIG. 1.

As shown in FIG. 1 and FIG. 2, the inward foldable screen electronic device 10 in Embodiment 1 may include a first housing 11, a hinge 12, a second housing 13, and a flexible display 14.

Two opposite sides of the hinge 12 are respectively connected to the first housing 11 and the second housing 13. The hinge 12 may be a mechanism including several components, and the hinge 12 can generate a mechanism movement. The mechanism movement of the hinge 12 enables the first housing 11 and the second housing 13 to rotate relative to each other, so that the first housing 11 can be unfolded or closed relative to the second housing 13, and the inward foldable screen electronic device 10 can be unfolded or folded.

Both the first housing 11 and the second housing 13 may be used as external parts of the inward foldable screen electronic device 10, that is, exposed parts that can be directly observed by a user. In another embodiment, the inward foldable screen electronic device 10 may include a housing used as an external part, and both the first housing 11 and the second housing 13 may be mounted in the housing as non-external parts (for example, a middle frame). The first housing 11 and the second housing 13 are configured to bear the flexible display 14, and drive the flexible display 14 to be bent and unfolded.

Figure 3:
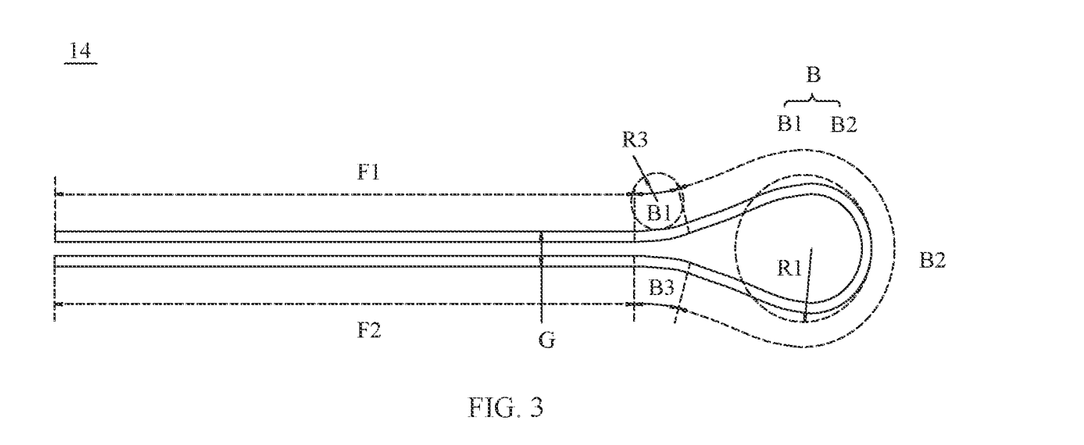
FIG. 3 is a schematic side view of a structure of a flexible display of the inward foldable screen electronic device in FIG. 1 in a bent state.
Figure 4:
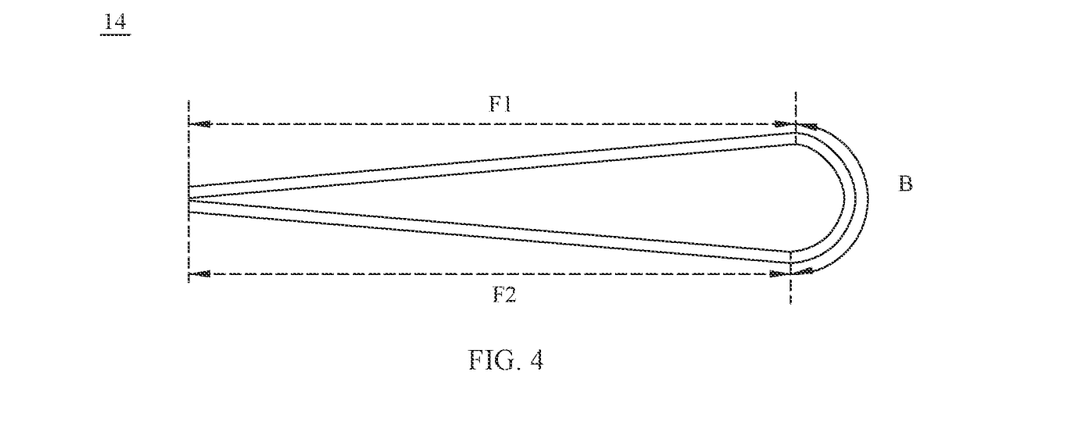
FIG. 4 is a schematic side view of another structure of the flexible display of the inward foldable screen electronic device in a bent state according to Embodiment 1.

The flexible display 14 has flexible and bendable performance. When the inward foldable screen electronic device 10 is in a folded state, the flexible display 14 may be bent and accommodated in the first housing 11 and the second housing 13. As shown in FIG. 2 to FIG. 4 (both FIG. 3 and FIG. 4 are side views of the flexible display 14 in a bent state), the flexible display 14 may be divided into a first flat region F1, a bending region B, and a second flat region F2 based on deformation of parts of the flexible display 14, and the bending region B is connected between the first flat region F1 and the second flat region F2. The first flat region F1 and the second flat region F2 are connected to two ends of the bending region B. The first flat region F1 may be fastened to the first housing 11, and the second flat region F2 may be fastened to the second housing 13. The bending region B is not connected to the first housing 11 and the second housing 13, and the bending region B may be spaced from the hinge 12 in both an unfolded state and a bent state, to avoid mutual interference. During bending and unfolding of the flexible display 14, the first flat region F1 and the second flat region F2 basically do not deform, and can remain in an original flat state, while the bending region B may be bent and unfolded.

In an implementation shown in FIG. 3, when the flexible display 14 is in the bent state, the first flat region F1 may be basically parallel to the second flat region F2. The bending region B may be in a "water drop shape", that is, the bending region B is in a shape like a water drop. The bending region B may include a transition region B1, a main bending region B2, and a transition region B3, and the main bending region B2 is connected between the transition region B1 and the transition region B3.

The transition region B1 may be in an arc shape, and the transition region B1 may be bent toward the transition region B3. For example, the transition region B1 is concave downward in the view of FIG. 3. The transition region B1 is smoothly connected to the first flat region F1 and the main bending region B2. The transition region B1 is used as a transition part between the first flat region F1 and the main bending region B2, or may be used as a region that is of the bending region B and that is adjacent to the first flat region F1. The transition region B1 may be tangent to both the first flat region F1 and the main bending region B2.

The transition region B3 may be in an arc shape, and the transition region B3 may be bent toward the transition region B1. For example, the transition region B3 is convex upward in the view of FIG. 3. The transition region B3 is smoothly connected to the second flat region F2 and the main bending region B2. The transition region B3 is used as a transition part between the second flat region F2 and the main bending region B2, or may be used as a region that is of the bending region B and that is adjacent to the second flat region F2. The transition region B3 may be tangent to both the second flat region F2 and the main bending region B2.

Bending radiuses of the transition region B1, the main bending region B2, and the transition region B3 may be defined for a region that needs to be focused on. The bending radius may be determined in the following manner: Several points are selected on an outer surface (which is a surface facing an outer side of the inward foldable screen electronic device 10) of the "region that needs to be focused on". These points may be referred to as fitting points, and a quantity of the fitting points may be, for example, 3. In the several fitting points, a specific fitting point may be used as a symmetric center, and remaining fitting points are symmetrically distributed on two sides of the symmetric center. A radius of a fitting circle that passes through the several fitting points is determined, and may be used as the bending radius. It may be understood that the bending radius is used to represent a bending shape. When the region that needs to be focused on changes, the bending radius also changes accordingly.

In this embodiment, bending radiuses may be defined at most convex parts of the transition region B1, the main bending region B2, and the transition region B3 respectively. In the bending region B in the "water drop shape" as shown in FIG. 3, a bending radius of the transition region B1 may be R3, and a bending radius of the main bending region B2 may be R1. R1>R3. For example, R1 may be 15 mm, and R3 may be 3 mm.

As shown in FIG. 3, for the bending region B in a "water drop shape", an opening spacing G and a bending arc length of the bending region B may be further limited. The opening spacing G may be a spacing from an outer surface of the first flat region F1 to an outer surface of the second flat region F2. For example, the opening spacing G may range from 0.3 mm to 0.5 mm (including endpoint values). The bending arc length may be a length of an arc formed on an outer surface of the entire bending region B in the view of FIG. 3, that is, a sum of lengths of three arcs formed on the outer surface of the transition region B1, the outer surface of the main bending region B2, and the outer surface of the transition region B3. The bending arc length may be, for example, 35 mm.

As shown in FIG. 4, in another implementation, when the flexible display 14 is in the bent state, the first flat region F1 is not parallel to the second flat region F2. Ends that are of the first flat region F1 and the second flat region F2 and that are away from the bending region B are relatively close to each other, and ends that are of the first flat region F1 and the second flat region F2 and that are connected to the bending region B are far away from each other. The overall flexible display 14 may be in a "bat shape", that is, the flexible display 1 is in a shape like a bat that hits a baseball. The flexible display 14 may not have the transition region B1 or the transition region B3, and two ends of the bending region B are smoothly connected to (for example, tangent to) the first flat region F1 and the second flat region F2 respectively.

The flexible display 14 shown in FIG. 3 is used as an example for further description below.

Figure 5:
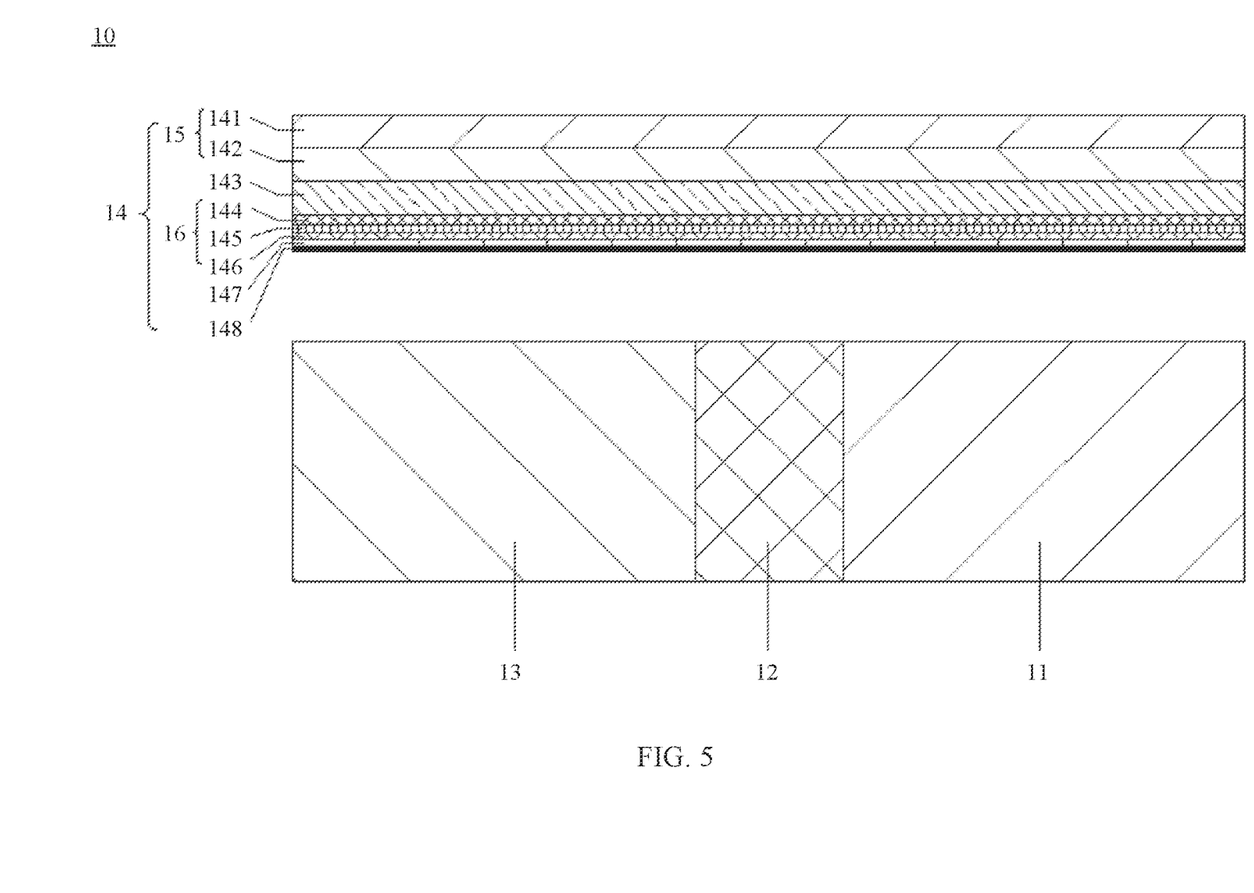
FIG. 5 is a schematic cross-sectional view of a structure of a flexible display according to Embodiment 1.

FIG. 5 shows a cross-sectional structure of the inward foldable screen electronic device 10. To clearly indicate a location relationship between the flexible display 14 and the first housing 11 and between the flexible display 14 and the second housing 13, the flexible display 14 is separated from the first housing 11 and the second housing 13.

As shown in FIG. 5, the flexible display 14 may include a flexible cover 15, a polarizer 143, a flexible display panel 16, a base film 147, and a support sheet 148 that are sequentially stacked. The flexible cover 15 is away from the first housing 11 and the second housing 13, and the support sheet 148 is located between the base film 147 and the first housing 11 and between the base film 147 and the second housing 13. A thickness of the flexible display 14 may be, for example, 321 μm or 363 μm.

The flexible cover 15 is used to protect the flexible display panel 16. As shown in FIG. 5, the flexible cover 15 may include a cover protective layer 141 and a cover substrate layer 142 that are attached to each other. The cover protective layer 141 is away from the polarizer 143, and the cover substrate layer 142 may be attached to the polarizer 143.

The cover protective layer 141 may be used as an outer protection structure of the flexible cover 15. A thickness of the cover protective layer 141 may range from 40 μm to 75 μm, for example, 40 μm, 60 μm, or 75 μm. A modulus of the cover protective layer 141 may be greater than or equal to 4 GPa, for example, 4.5 GPa or 6 GPa. Such a cover protective layer 141 has good impact resistance. The cover protective layer 141 may have proper hardness, to provide a proper touch feeling.

The cover substrate layer 142 may be used as a main support structure of the flexible cover 15. A thickness of the cover substrate layer 142 may range from 40 μm to 80 μm, for example, 40 μm, 50 μm, 60 μm, or 80 μm. A modulus of the cover substrate layer 142 may be greater than or equal to 7 GPa, for example, 8 GPa or 15 GPa. Such a cover substrate layer 142 may have good impact resistance. The cover substrate layer 142 may be made of polyimide (polyimide, PI), or may be made of another suitable material like ultrathin glass (ultrathin glass, UTG).

As shown in FIG. 5, the polarizer 143 may be attached between the cover substrate layer 142 and the flexible display panel 16. A thickness of the polarizer 143 may range from 40 μm to 73 μm, for example, 40 μm, 50 μm, 60 μm, or 73 μm. A modulus of the polarizer 143 may be less than or equal to 4 GPa, for example, 4 GPa or 3 GPa.

As shown in FIG. 5, the flexible display panel 16 may include an encapsulation layer 144, a light-emitting layer 145, and a substrate 146 that are sequentially stacked. The encapsulation layer 144 is located between the polarizer 143 and the light-emitting layer 145, and the polarizer 143 may be attached to the encapsulation layer 144. The substrate 146 is located between the light-emitting layer 145 and the base film 147, and the base film 147 may be attached to the substrate 146.

For example, the substrate 146 may be made of PI. A thin film transistor (thin film transistor, TFT) array may be formed on the substrate 146. Such a flexible display panel 16 may be an active matrix organic light-emitting diode (active matrix OLED, AMOLED) flexible display panel. Alternatively, the TFT array may not be formed on the substrate 146. Such a flexible display panel 16 may be a passive matrix organic light-emitting diode (passive matrix OLED, PMOLED) flexible display panel. A thickness of the substrate 146 may be, for example, 16.3 μm (a thickness excluding the thin film transistor array). A modulus of the substrate 146 is approximately 5 GPa to 9 GPa. For the PMOLED flexible display panel, a thickness of the TFT array may be 7.34 μm, and a modulus of the TFT array is approximately 35 GPa (for example, 36.3 GPa).

The light-emitting layer 145 is formed on the substrate 146. The light-emitting layer 145 can emit light, so that the flexible display panel 16 implements display. For example, the light-emitting layer 145 may be made of an organic light-emitting diode (organic light-emitting diode, OLED) material. A modulus of the light-emitting layer 145 is approximately 4 GPa to 5 GPa.

The encapsulation layer 144 covers the light-emitting layer 145 to encapsulate the light-emitting layer 145, to block water and oxygen and ensure performance and a service life of the light-emitting layer 145. Fax example, the encapsulation layer 144 may be manufactured by using a thin film encapsulation (thin film encapsulation, TFE) process. A thickness of the encapsulation layer 144 may be, for example, 11.6 μm. A modulus of the encapsulation layer 144 is approximately 25 GPa (for example, 25.17 GPa).

As shown in FIG. 5, the base film (base film, BF) 147 may be attached to the substrate 146 by using an adhesive, and the base film 147 may protect a rear side of the flexible display panel 16. A thickness of the base film 147 may range from 15 μm to 25 μm, for example, 15 μm, 20 μm, or 25 μm. The base film 147 in Embodiment 1 is thinner than a conventional base fill, and a thickness of the conventional base film may reach, for example, 50 μm or 75 μm. A modulus of the base film 147 may be 3 GPa to 8 GPa, and a typical value may be 3 GPa, 5 GPa, or 8 GPa. The base film 147 may be made of polyimide.

As shown in FIG. 5, the support sheet 148 may be attached to the base film 147. The support sheet 148 may be used as a support and load-bearing structure in the flexible display 14. When the support sheet 148 is not bent, the support sheet 148 may be in a flat sheet shape. This can ensure flatness of the flexible display 14. The support sheet 148 may be made of metal, for example, stainless steel (such as SUS stainless steel) or copper. The support sheet 148 may be of a complete sheet structure. Such a support sheet 148 has a complete and continuous surface, and the surface of the support sheet 148 basically has no structure features such as holes and grooves obtained by removing materials. A thickness of the support sheet 148 may range from 0.02 mm to 0.03 mm, and a typical value may be 0.02 mm, 0.025 mm, or 0.03 mm. Such a support sheet 148 has high structural strength and good bending performance. A modulus of the support sheet 148 may be 180 GPa to 210 GPa and a typical value may be 180 GPa, 200 GPa or 210 GPa.

A conventional flexible display of a conventional inward foldable screen electronic device having a "water drop shape" may be of a structure basically the same as that of the flexible display 14 shown in FIG. 3. Therefore, the flexible display of the conventional inward foldable screen electronic device may be described with reference to FIG. 3. In the conventional flexible display, a bonding force between the encapsulation layer 144 and the light-emitting layer 145 is relatively weak. When the conventional flexible display is in a bent state, a bending degree of the transition region B1 is relatively large. An internal force in the transition region B1 is also relatively large. For example, when the conventional flexible display is in the bent state, both sides of an interface between the encapsulation layer 144 and the light-emitting layer 145 that are located in the transition region B1 are subject to relatively large pulling forces in opposite directions. Due to the foregoing factor, after the conventional flexible display is bent for a plurality of times, the encapsulation layer 144 and the light-emitting layer 145 that are located in the transition region B1 are prone to lift off from each other. For a same reason, the encapsulation layer 144 and the light-emitting layer 145 that are located in the transition region B3 are also prone to lift off from each other.

The lift-off causes a failure of the conventional flexible display, for example, causes a display exception. However, it is difficult to alleviate a lift-off problem by improving the bonding force between the encapsulation layer 144 and the light-emitting layer 145. In view of this, in the solution of Embodiment 1, the thickness of the base film 147 is adjusted, so that locations of the neutral layer in the transition region B1 and the neutral layer in the transition region B3 change, to alleviate the lift-off problem. Adjusting the thickness of the base film 147 to change the location of the neutral layer relates to a related principle of material mechanics. This is described in detail below.

Figure 6:
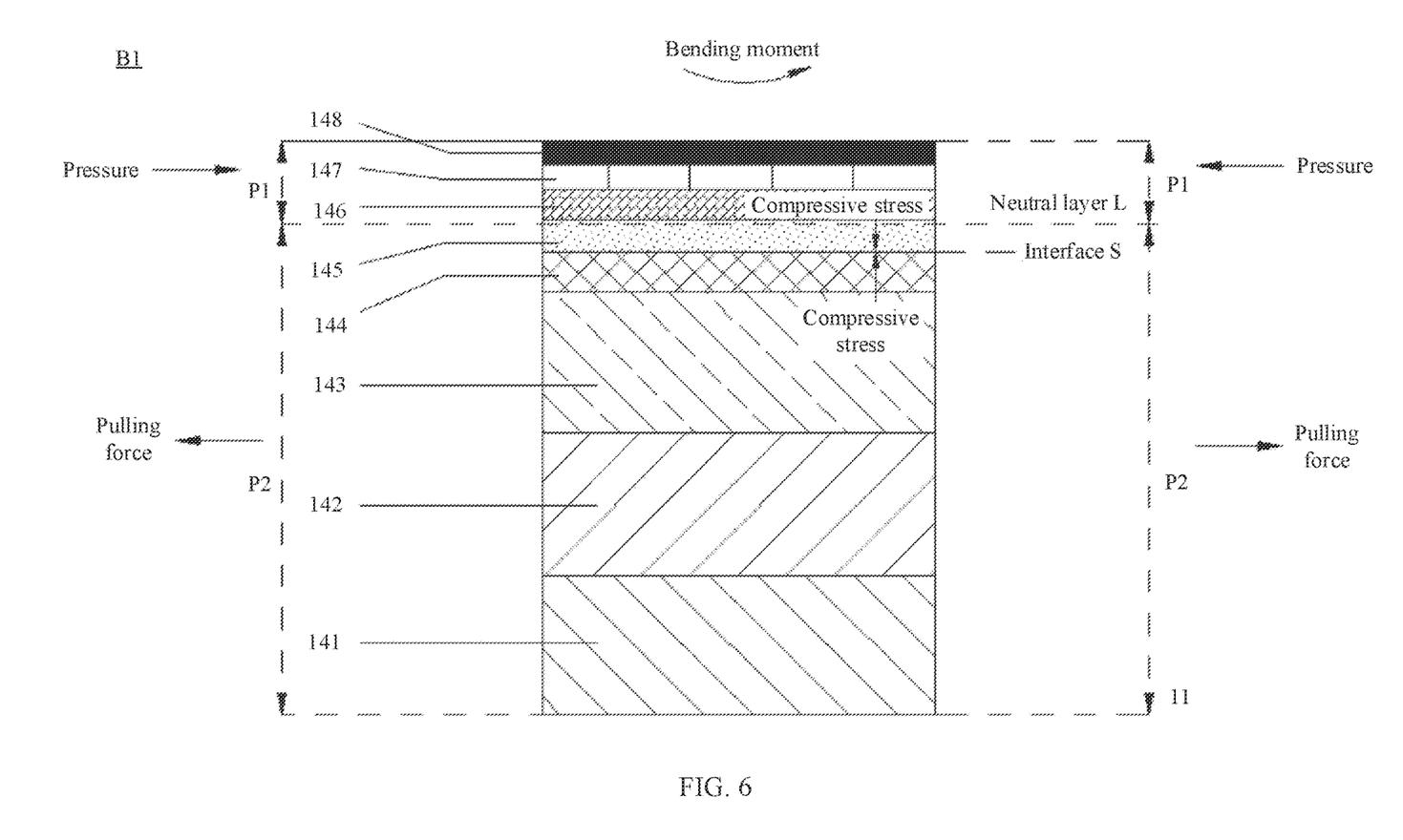
FIG. 6 is a schematic cross-sectional view of a structure of a transition region B1 of the flexible display in FIG. 3, where a neutral layer of the transition region B1 and related force-bearing analysis are shown.

FIG. 6 shows a schematic sectional structure of the transition region B1 of the flexible display 14 in FIG. 3. As shown in FIG. 6, the transition region 131 is subject to a bending moment. The bending moment is represented by an arc arrow, and the arc arrow represents a bending trend of the transition region B1 under an action of the bending moment. For example, in the view of FIG. 6, the transition region B1 has a downward concave bending trend. It may be understood that the transition region B1 in FIG. 6 is not in a bent form, and this is merely an example for clear drawing.

The transition region B1 has a neutral layer L. The neutral layer L is neither subject to a pulling force nor pressure, so that the neutral layer L is not elongated or shortened when being bent. Parts that are of the transition region B1 and that are located on two sides of the neutral layer L are respectively stretched and compressed. For example, in the view of FIG. 6, a part P1 on an upper side of the neutral layer L is compressed, and a part P2 on a lower side of the neutral layer L is stretched. A part that is farther away from the neutral layer L is compressed or stretched to a greater extent.

Two opposite sides of the stretched part P2 are subject to reverse pulling forces. Two opposite sides of a region that is in the part P2 and that is farther away from the neutral layer L are subject to larger reverse pull forces. On the contrary, two opposite sides of a region that is in the part P2 and that is closer to the neutral layer L are subject to smaller reverse pull forces. Under an action of the reverse pulling force, any cross section (a cross section parallel to the neutral layer, for example, an interface S between the light-emitting layer 145 and the encapsulation layer 144) of the part P2 is subject to a reverse normal compressive stress. A section that is in the part P2 and that is farther away from the neutral layer L is subject to a larger reverse normal compressive stress. On the contrary, a section that is in the part P2 and that is closer to the neutral layer L is subject to a smaller re-verse normal compressive stress.

A similar conclusion is obtained for the part P1: Two opposite sides of the compressed part P1 are subject to reverse pressure. Two opposite sides of a region that is in the part P1 and that is farther away from the neutral layer L are subject to larger reverse pressure. On the contrary, two opposite sides of a region that is in the part P1 and that is closer to the neutral layer L are subject to smaller reverse pressure. Under an action of the reverse pressure, any section of the part P1 is subject to a reverse tensile stress. A section that is in the part P1 and that is farther away from the neutral layer L is subject to a larger reverse tensile stress. On the contrary, a section that is in the part P1 and that is closer to the neutral layer L is subject to a smaller reverse tensile stress.

A location of the neutral layer L can be calculated based on a related theory of material mechanics, and can be calculated by using a simulation platform in actual application. When simulation calculation is performed on the flexible display 14 by using the simulation platform, necessary inputs may include: a three-dimensional model of the flexible display 14, the modulus and the thickness of the support sheet 148, the modulus and the thickness of the base film 147, the modulus and the thickness of the substrate 146, the modulus and the thickness of the light-emitting layer 145, the modulus and the thickness of the encapsulation layer 144, the modulus and the thickness of the polarizer 143, the modulus and the thickness of the cover substrate layer 142, the modulus and the thickness of the cover protective layer 141, and the bending radius R1, the bending radius R3, the opening spacing G, and the bending arc length of the flexible display 14.

After a large amount of simulation calculation, the applicant finds that a neutral layer of the transition region B1 can be closer to the support sheet 148 than the interface S by using a thinner base film 147, that is, the neutral layer L is located on a side that is of the interface S and that is away from the encapsulation layer 144. For example, as shown in FIG. 6, when the thickness of the base film 147 is set to 15 μm to 25 μm, the neutral layer L may be located in the light-emitting layer 145, and the neutral layer L is closer to the support sheet 148 than the interface S. For example, in the view of FIG. 6, it may be considered that the neutral layer L is located above the interface S. The location of the neutral layer L shown in FIG. 6 is merely an example. In actual application, based on specific different thicknesses of the base film 147, the neutral layer L is not limited to be in the light-emitting layer 145. For example, the neutral layer L may alternatively be in the substrate 146, even in the base film 147 or the support sheet 148.

It can be learned from the foregoing theory that, because the interface S is in the part P2, the interface S is subject to a reverse normal compressive stress (as shown in FIG. 6), and the reverse normal compressive stress is used to separately press parts on both sides of the interface S to the interface S, so that the parts on both sides of the interface S are not prone to lift off from each other. Therefore, a problem that the light-emitting layer 145 and the encapsulation layer 144 lift off from each other is alleviated.

Compared with a conventional base film, a thickness design of the base film 147 in Embodiment 1 enables the neutral layer of the transition region B1 to be farther away from the interface S, so that a compressive stress on the interface S is larger, and the light-emitting layer 145 and the encapsulation layer 144 are more difficult to lift off from each other. Details are analyzed below.

Figure 7:
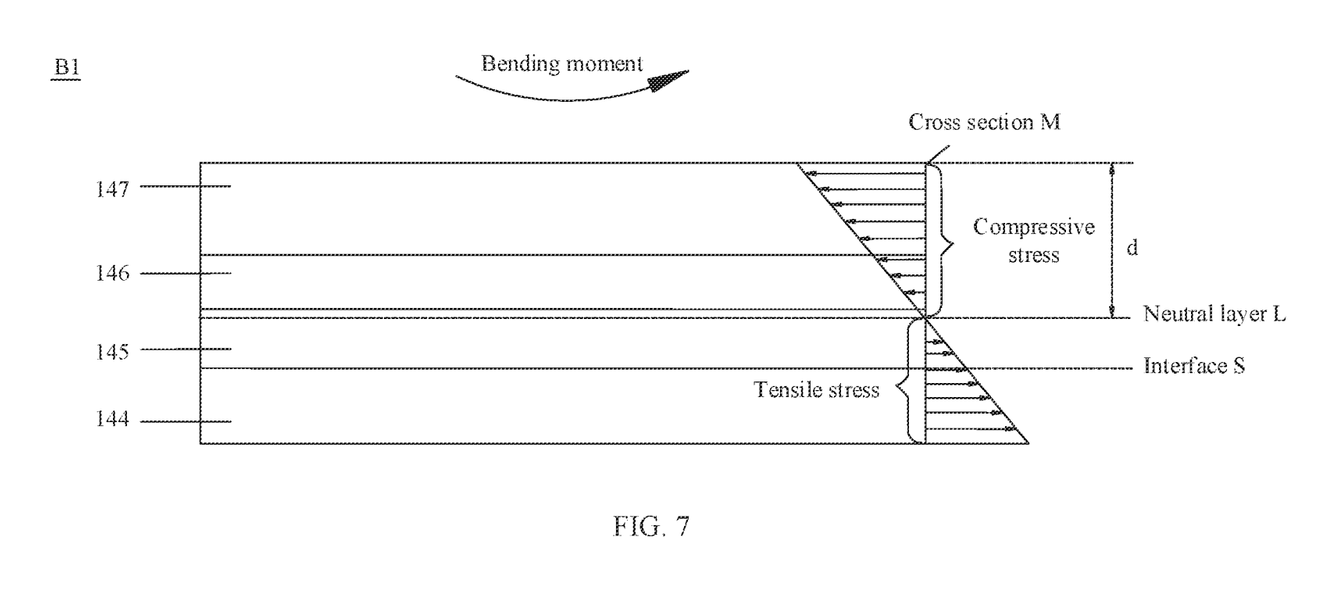
FIG. 7 is a schematic diagram of force-bearing analysis on a cross section M of a local region in the transition region B1 in FIG. 6.

FIG. 7 is a diagram of force-bearing analysis of a local region (including the base film 147, the substrate 146, the light-emitting layer 145, and the encapsulation layer 144) in the transition region B1 in FIG. 6. With reference to FIG. 1 and FIG. 7, the local region is subject to pressure applied by the housing 11. Under an action of the pressure, a resultant force of stresses on a cross section M (in the view of FIG. 7, the cross section M is projected into a vertical line located at a right end of the local region) in the local region may be a normal compressive stress.

According to a related principle of material mechanics, a region located on one side (an upper side in the view of FIG. 7) of the neutral layer L is compressed, and therefore is subject to a compressive stress; and a region located on the other side (a lower side in the view of FIG. 7) of the neutral layer L is stretched, and therefore is subject to a tensile stress. The compressive stress and tensile stress are represented by arrows. A start point of the arrow is on the cross section M. A length of the arrow represents magnitude of the compressive stress or tensile stress. The arrow pointing to an interior of the local region represents the compressive stress, and the arrow pointing to an exterior of the local region represents the tensile stress. A location farther away from the neutral layer indicates a larger compressive stress or tensile stress. This is embodied as follows: The location farther away from the neutral layer indicates a longer length of the arrow. A connection line between a tail end of the arrow representing the compressive stress and a tail end of the arrow representing the tensile stress intersects the cross section M, and an intersection point represents the location of the neutral layer L. In this figure, two triangles are formed. Areas of the two triangles represent magnitude of the compressive stress and tensile stress respectively. As described above, the resultant force of the stress on the cross section M may be a normal compressive stress. Therefore, the area of the compressive stress triangle (the upper triangle in the view of FIG. 7) may be greater than the area of the tensile stress triangle (the lower triangle in the view of FIG. 7). In addition, a distance from the neutral layer L to an outer surface of the base film 147 is d.

Figure 8:
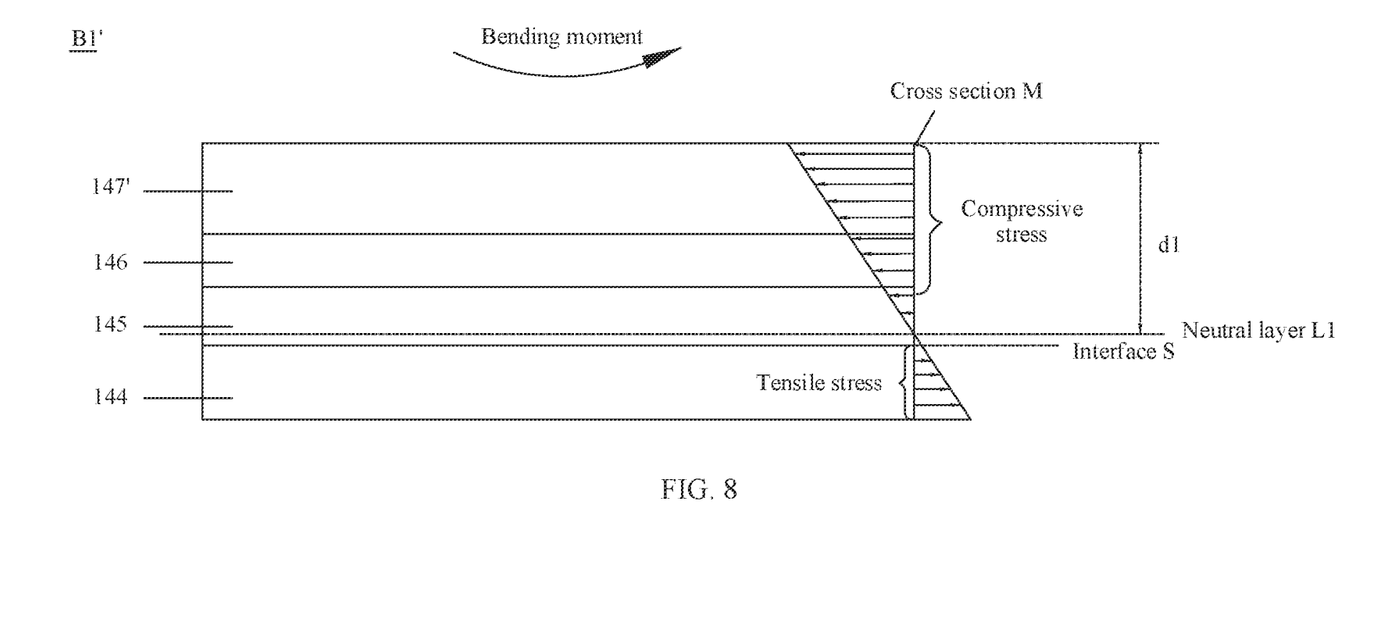
FIG. 8 is a schematic diagram of force-bearing analysis on a cross section M of a local region in a transition region B1' of another flexible display.

The following performs force-bearing analysis on a conventional flexible display with reference to FIG. 8. FIG. 8 is a diagram of force-bearing analysis obtained by replacing the base film 147 in FIG. 7 with a conventional base film 147' to obtain a local region of a transition region B1' and then performing force-bearing analysis on the local region of the transition region B1'. The transition region B1' has the same meaning as the transition region B1. However, for ease of description, different names are used to distinguish.

As shown in FIG. 8, a relatively thick conventional base film 147' is used in the conventional flexible display. For example, a thickness of the conventional base film 147' may reach 50 μm or 70 μm. As shown in FIG. 8, because the conventional base film 147' is relatively thick, the conventional flexible display is also relatively thick. To form a same "water drop shape", the local region of the conventional flexible display is subject to relatively high pressure applied by the housing 11. As a result, the resultant force of the stress on the cross section M in the local region is still the normal compressive stress, but the normal compressive stress is larger. Therefore, in FIG. 8, the area of the compressive stress triangle is increased, and the area of the tensile stress triangle is reduced. A location of a neutral layer L1 in the transition region B1' may be determined according to the foregoing illustrated force-bearing analysis method. For example, it may be determined that the neutral layer L1 is located in the light-emitting layer 145, but the neutral layer L1 is closer to the interface S than the neutral layer L. To be specific, a distance d1 from the neutral layer L1 to an outer surface of the conventional base film 147' is greater than the distance d from the neutral layer L to the outer surface of the base film 147.

Certainly, a location of the neutral layer L1 shown in FIG. 8 is merely an example. Based on different forces applied to a conventional flexible display, the neutral layer L1 may alternatively be located below the interface S (the "below" is an example in the view of FIG. 8). For example, the neutral layer L1 may be in the encapsulation layer 144. In this case, the distance d1 from the neutral layer L1 to the conventional base film 147' is greater than the distance d from the neutral layer L to the base film 147. The location of the neutral layer L1 of the conventional flexible display may be verified through simulation calculation.

It can be learned through comparison between FIG. 7 and FIG. 8 that, compared with the conventional base film 147, because the base film 147 in Embodiment 1 is thinned, the neutral layer L is closer to the base film 147. According to the foregoing related principle of material mechanics, and with reference to FIG. 8 and FIG. 6, and to FIG. 7 and FIG. 6 respectively, it can be learned that the neutral layer L1 in FIG. 8 is above the interface S, and is close to the interface S. Therefore, a reverse compressive stress on the interface S in FIG. 8 is small. The neutral layer L in FIG. 7 is above the interface S, and is far away from the interface S. Therefore, a reverse normal compressive stress on the interface S in FIG. 7 is large. When the reverse compressive stress on the interface S is large, the light-emitting layer 145 and the encapsulation layer 144 on both sides of the interface S are not prone to lift off from each other.

For the conventional flexible display whose neutral layer 11 is below the interface 5, according to the foregoing principle of material mechanics, in this solution, the interface S is subject to a reverse tensile stress, which increases a risk of the light-emitting layer 145 and the encapsulation layer 144 on both sides of the interface S lifting off from each other.

Therefore, in the solution in Embodiment 1, the base film 147 is thinned, so that the transition region B1 of the flexible display is less likely to have a lift-off problem than the transition region B1' of the conventional flexible display, and reliability of the flexible display is higher.

In addition, it can be learned from the foregoing analysis that, if the thickness of the base film 147 is further reduced, the neutral layer L of the transition region B1 may be farther away from the interface S (for example, the neutral layer L is located in the substrate 146). This helps further increase the normal compressive stress on the interface S, to further reduce the lift-off risk. However, an excessively small thickness of the base film 147 causes an excessively large pulling force on one side of the neutral layer L in the transition region B1. This easily causes damage to the side. After a large amount of verification, the applicant finds that the thickness of the base film 147 is set to a proper range of 15 μm to 25 μm, so that not only a lift-off problem can be alleviated, but also the flexible display can be prevented from being subject to a large pulling force, and reliability of the flexible display can be comprehensively improved.

The transition region B1 is used as a research object above, and a conclusion that a thin base film 147 can be used to alleviate lift-off problem in the transition region B1 and improve reliability of the flexible display is obtained. It is understood that this conclusion is also applicable to the transition region B3.

In addition, the encapsulation layer 144 and the light-emitting layer 145 of a flexible display of a conventional inward foldable screen electronic device having a "bat shape" may also lift off from each other in a region that is of the bending region B and that is adjacent to the first flat region F1 and a region that is of the bending region B and that is adjacent to the second flat region F2. The lift-off problem of the foregoing two regions can also be alleviated by using a thin base film 147. A specific principle is the same as that described above. Details are not described herein again.

In conclusion, in the solution of Embodiment 1, the base film 147 is thinned, so that the flexible display 14 is not prone to lift off. This ensures that the flexible display 14 has higher reliability. In addition, because a thin base film 147 is used, the flexible display 14 has a small thickness. This helps implement lightness and thinness of the inward foldable screen electronic device 10.

With reference to FIG. 6, in Embodiment 1, thinning the base film 147 is essentially reducing stiffness of a laminate (including the base film 147 and the support sheet 148) on a rear side of the flexible display panel 16 (compared with a conventional flexible display). After the stiffness is reduced, the laminate on the rear side of the flexible display panel 16 is more likely to deform. The transition region B1 of the flexible display is subject to less pressure from the housing 11 than the transition region B1' of the conventional flexible display from the housing 11, provided that a same "water drop shape" is ensured. According to the foregoing related principle of material mechanics, it can be learned through comparison between FIG. 7 and FIG. 8 that, in this case, although both the resultant force of the stress on the cross section M of the transition region B1 and the resultant force of the stress on the cross section M of the transition region B1' are normal compressive stresses, the area of the compressive stress triangle on the cross section M of the transition region B1 is smaller than the area of the compressive stress triangle on the cross section M of the transition region B1'. Therefore, the neutral layer L of the transition region B1 is closer to the base film 147 than the neutral layer L1 of the transition region B1', so that a lift-off problem in the transition region B1 can be alleviated or even avoided. Similarly, stiffness of the laminate on the rear side of the flexible display panel 16 is reduced, so that a lift-off problem in the transition region B3 can be alleviated. Moreover, this conclusion is also applicable to the flexible display having the "bat shape".

Therefore, from a perspective of reducing the stiffness of the laminate on the rear side of the flexible display panel 16, a location of the neutral layer L can also be adjusted, to alleviate and avoid a lift-off problem of the flexible display. The following introduces other embodiments based on this design idea.

In Embodiment 2, different from Embodiment 1, the base film 147 in Embodiment 2 may be thick, for example, 50 μm to 75 μm. However, a modulus of the base film 147 may be a small value, for example, 3 GPa to 5 GPa, and a typical value may be 3 GPa or GPa. A modulus of the conventional base film 147' may be 5 GPa to 8 GPa (the modulus of the conventional base film 147' is not equal to the modulus of the base film 147). Therefore, stiffness of the laminate on the rear side of the flexible display panel 16 in Embodiment 2 is less than stiffness of the laminate on the rear side of the flexible display panel 16 of the conventional flexible display. According to the foregoing conclusion, a lift-off problem of the flexible display in Embodiment 2 can be alleviated and avoided, and reliability of the flexible display is higher.

As a further improvement, the thickness of the base film 147 may be reduced (for example, the thickness of the base film 147 ranges from 15 μm to 25 μm), while the modulus of the base film 147 may be reduced (for example, the modulus of the base film 147 is 3 GPa to 5 GPa), so that the stiffness of the laminate on the rear side of the flexible display panel 16 is further reduced, and a lift-off risk of the flexible display is further reduced.

A thickness of a conventional support sheet in the conventional flexible display may be 0.03 mm to 0.05 mm. In Embodiment 3, different from the foregoing embodiments, a thickness of the support sheet 148 may be reduced, for example, the thickness of the support sheet 148 is 0.02 mm to 0.03 mm, and a typical value may be 0.02 mm or 0.025 mm (the thickness of the support sheet 148 is different from the thickness of a conventional support sheet). In this way, stiffness of the laminate on the rear side of the flexible display panel 16 in Embodiment 3 can also be less than stiffness of the laminate on the rear side of the flexible display panel 16 of the conventional flexible display. According to the foregoing conclusion, a lift-off problem of the flexible display in Embodiment 3 can be alleviated and avoided, and reliability of the flexible display is higher. In addition, because a thin support sheet 148 is used, the flexible display 14 has a small thickness. This helps implement lightness and thinness of the inward foldable screen electronic device 10.

In Embodiment 4, the base film 147 may be connected to the substrate 146 of the flexible display panel 16 by using an adhesive layer (a layer formed by an adhesive) with a low modulus. A modulus of the adhesive layer may be, for example, 30 KPa to 80 KPa. A material of the adhesive layer may be, for example, a pressure sensitive adhesive (pressure sensitive adhesive, PSA) or an optically clear adhesive (optically clear adhesive, OCA).

In comparison, a modulus of the adhesive layer that connects the conventional base film 147' and the flexible display panel 16 in the conventional flexible display is usually large, for example, may reach 80 KPa to 200 KPa (the modulus of the adhesive layer in Embodiment 4 is different from a modulus of the adhesive layer in the conventional flexible display). The modulus of the adhesive layer is reduced, so that stiffness of the laminate on the rear side of the flexible display panel 16 in Embodiment 4 can also be less than stiffness of the laminate on the rear side of the flexible display panel 16 of the conventional flexible display. According to the foregoing conclusion, a lift-off problem of the flexible display in Embodiment 4 can be alleviated and avoided, and reliability of the flexible display is higher.

In another embodiment, at least two of the foregoing embodiments may be combined at the same time, to reduce stiffness of the laminate on the rear side of the flexible display panel 16, and further alleviate or even completely avoid a lift-off problem. For example, a thickness and a modulus of the base film 147 may be reduced. Alternatively, a thickness of the base film 147 and a thickness of the support sheet 148 may be reduced. Alternatively, a modulus of the base film 147 and a thickness of the support sheet 148 may be reduced. Alternatively, a thickness of the base film 147, a modulus of the base film 147, and a thickness of the support sheet 148 may be reduced. Alternatively, a thickness of the base film 147 and a modulus of the adhesive layer may be reduced. Alternatively, a thickness of the support sheet 148 and a modulus of the adhesive layer may be reduced. Alternatively, a thickness of the base film 147, a modulus of the base film 147, a thickness of the support sheet 148, and a modulus of the adhesive layer may be reduced.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inward foldable screen electronic device, comprising:
    a first housing;
    a second housing;
    a hinge coupled to the first housing and the second housing, wherein the first housing configured to rotate rotates relative to the second housing using the hinge; and
    a flexible display comprising:
        a bending region;
        a flat region connected to the bending region;
        a first side of the flexible display that is away from the hinge;
        an encapsulation layer located on the first side;
        a light-emitting layer;
        a substrate;
        a base film; and
        a support sheet having a complete surface,
        wherein the encapsulation layer, the light-emitting layer, the substrate, the base film, and the support sheet are sequentially stacked,
        wherein the flexible display is mounted on the first housing and the second housing,
        wherein when the first housing and the second housing are closed, the flexible display is bent and accommodated between the first housing and the second housing, and
    wherein at least one of a thickness of the base film is 15 μm (micrometers) to 25 μm, a modulus of the base film is 3 GPa (gigapascals) to 5 GPa, or a thickness of the support sheet is 0.02 mm (millimeters) to 0.03 mm so that, when the flexible display is in a bent state, a neutral layer of a region that is of the bending region and that is adjacent to the flat region is located on a second side that is of an interface between the encapsulation layer and the light-emitting layer and that is away from the encapsulation layer.

2. The inward foldable screen electronic device of claim 1, wherein the flexible display further comprises an adhesive layer that bonds the base film to the substrate, and wherein a modulus of the adhesive layer is 30 KPa (kilopascals) to 80 KPa.

3. The inward foldable screen electronic device of claim 2, wherein the adhesive layer is a pressure sensitive adhesive layer.

4. The inward foldable screen electronic device of claim 1, wherein the base film is a polyimide film.

5. The inward foldable screen electronic device of claim 1, wherein a modulus of the support sheet is 180 GPa to 210 GPa.

6. The inward foldable screen electronic device of claim 1, wherein the support sheet is a metal sheet.

7. The inward foldable screen electronic device of claim 1, wherein when the flexible display is in the bent state, the bending region is in a water drop shape.

8. The inward foldable screen electronic device of claim 1, wherein the flexible display further comprises:
    a flexible cover; and
    a polarizer stacked on the flexible cover, wherein the polarizer is located between the flexible cover and the encapsulation layer.

9. The inward foldable screen electronic device of claim 8, wherein the flexible cover comprises:
    a cover protective layer; and
    a cover substrate layer stacked on the cover protective layer, wherein the cover substrate layer is located between the cover protective layer and the polarizer, wherein a thickness of the cover protective layer is 40 μm to 75 μm, wherein a modulus of the cover protective layer is greater than or equal to 4 GPa, wherein a thickness of the cover substrate layer is 40 μm to 80 μm, and wherein a modulus of the cover substrate layer is greater than or equal to 7 GPa.

10. The inward foldable screen electronic device of claim 9, wherein a thickness of the base film is 15 μm to 25 μm, wherein a thickness of the support sheet is 0.02 mm to 0.03 mm, wherein a thickness of the polarizer is 40 μm to 73 μm, and wherein a modulus of the polarizer is less than or equal to 4 GPa.

11. The inward foldable screen electronic device of claim 9, wherein the cover substrate layer is made of polyimide.

12. The inward foldable screen electronic device of claim 9, wherein the cover substrate layer is made of ultrathin glass.

13. The inward foldable screen electronic device of claim 2, wherein the adhesive layer is an optically clear adhesive layer.

14. The inward foldable screen electronic device of claim 1, wherein the thickness of the base film is 15 μm to 25 μm, and wherein the modulus of the base film is 3 GPa to 5 GPa.

15. The inward foldable screen electronic device of claim 14, wherein the modulus of the base film is 3 GPa to 5 GPa.

16. The inward foldable screen electronic device of claim 15, wherein the thickness of the support sheet is 0.02 mm to 0.03 mm.

17. The inward foldable screen electronic device of claim 14, wherein the thickness of the support sheet is 0.02 mm to 0.03 mm.

18. The inward foldable screen electronic device of claim 1, wherein the modulus of the base film is 3 GPa to 5 GPa.

19. The inward foldable screen electronic device of claim 18, wherein the thickness of the support sheet is 0.02 mm to 0.03 mm.

20. The inward foldable screen electronic device of claim 1, wherein the thickness of the support sheet is 0.02 mm to 0.03 mm.

* * * * *